(12) United States Patent
Fahlenkamp et al.

(10) Patent No.: US 9,673,718 B2
(45) Date of Patent: Jun. 6, 2017

(54) VOLTAGE CONVERSION METHOD AND VOLTAGE CONVERTER

(71) Applicant: Infineon Technologies Austria AG, Villach (AT)

(72) Inventors: Marc Fahlenkamp, Geretsried (DE); Anders Lind, San Jose, CA (US); Sanjaya Pradhan, Fremont, CA (US)

(73) Assignee: Infineon Technologies Austria AG, Villach (AT)

( * ) Notice: Subject to any disclaimer, the term of this patent is extended or adjusted under 35 U.S.C. 154(b) by 83 days.

(21) Appl. No.: 14/706,500

(22) Filed: May 7, 2015

(65) Prior Publication Data
US 2016/0329814 A1 Nov. 10, 2016

(51) Int. Cl.
*H02M 3/335* (2006.01)
*H02M 1/00* (2006.01)

(52) U.S. Cl.
CPC ... *H02M 3/33569* (2013.01); *H02M 3/33523* (2013.01); *H02M 2001/0006* (2013.01); *H02M 2001/0058* (2013.01); *H02M 2001/0064* (2013.01)

(58) Field of Classification Search
CPC ............. H02M 3/335; H02M 3/33569; H02M 3/33507; H02M 3/33515; H02M 3/33523
USPC ... 363/20, 21.01, 21.12, 21.13, 21.15, 21.16
See application file for complete search history.

(56) References Cited

U.S. PATENT DOCUMENTS

| 5,126,931 | A | 6/1992 | Jitaru | |
|---|---|---|---|---|
| 7,450,404 | B2 | 11/2008 | Chang | |
| 7,924,578 | B2 | 4/2011 | Jansen et al. | |
| 9,414,468 | B2 * | 8/2016 | Knoedgen | H05B 37/0272 |
| 2009/0302814 | A1 | 12/2009 | Kapels et al. | |
| 2010/0194445 | A1 * | 8/2010 | Balakrishnan | H02M 3/33507 327/108 |
| 2010/0226149 | A1 * | 9/2010 | Masumoto | H02M 1/4225 363/20 |
| 2012/0026758 | A1 * | 2/2012 | Lee | H02M 3/33576 363/21.13 |
| 2013/0148385 | A1 | 6/2013 | Zhang | |
| 2014/0043863 | A1 * | 2/2014 | Telefus | H02M 3/33592 363/17 |
| 2016/0111961 | A1 * | 4/2016 | Balakrishnan | H02M 3/33507 363/21.12 |

FOREIGN PATENT DOCUMENTS

EP 0464246 A1 1/1992

* cited by examiner

*Primary Examiner* — Adolf Berhane
(74) *Attorney, Agent, or Firm* — Slater Matsil, LLP

(57) ABSTRACT

In accordance with an embodiment, a method in a voltage converter includes, in each of successive drive cycles, switching on for an on-period a first electronic switch connected in series with a primary winding of a transformer. Before first electronic switch is switched on, the transformer is pre-magnetized for a pre-magnetizing period, where there is a first delay time between an end of the pre-magnetizing period and a beginning of the on-period.

30 Claims, 7 Drawing Sheets

US 9,673,718 B2

VOLTAGE CONVERSION METHOD AND VOLTAGE CONVERTER

TECHNICAL FIELD

Embodiments of the present invention relate to a voltage conversion method, in particular a method for operating a flyback converter in discontinuous conduction mode (DCM), and a voltage converter.

BACKGROUND

Switched mode voltage converters (switched mode power supplies, SMPS) are widely used for power conversion in automotive, industrial, or consumer electronic applications. A flyback converter is a specific type of switched mode voltage converter, which includes a transformer with a primary winding and a secondary winding that have opposite winding senses. An electronic switch is connected in series with the primary winding, whereas the transformer is magnetized when the electronic switch is closed and demagnetized when the electronic switch is opened. Magnetizing the transformer includes storing energy in the transformer, and demagnetizing the transformer includes transferring the stored energy to the primary winding and a load coupled thereto.

A flyback converter can be operated in a discontinuous conduction mode (DCM). In this operation mode there is a delay time between the time when the transformer has been completely demagnetized and the time when the electronic switch again switches on. During this delay time, parasitic oscillations of a voltage across the electronic switch may occur. In the DCM, the flyback converter may be operated in a quasi-resonant operation mode, in which the electronic switch switches on at those times when the voltage across the electronic switch reaches a minimum. When operating the flyback converter in the quasi-resonant mode the switching frequency of the electronic switch varies, while operating the electronic switch in the flyback converter at a fixed frequency may result in increased switching losses. Nevertheless, there may be scenarios where it is desirable to operate a flyback converter in the DCM at a fixed frequency.

SUMMARY

Thus, there is a need for a method to operate a flyback converter in the DCM at a fixed frequency and low switching losses.

One embodiment relates to a method in a voltage converter. The method includes in each of successive drive cycles, switching on for an on-period a first electronic switch connected in series with a primary winding of a transformer, and, before switching on the first electronic switch, pre-magnetizing the transformer for a pre-magnetizing period. In this method there is a first delay time between an end of the pre-magnetizing period and a beginning of the on-period.

One embodiment relates to a voltage converter. The voltage converter includes a transformer having a primary winding, a first electronic switch connected in series with the primary winding, and a control circuit. The control circuit is configured in each of a plurality of successive drive cycles to switch on for an on-period the first electronic switch, before switching on the first electronic switch, to cause the transformer to be pre-magnetized for a pre-magnetizing period, and to generate a first delay time between an end of the pre-magnetizing period and a beginning of the on-period.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practised. It is to be understood that the features of the various embodiments described herein may be combined with each other, unless specifically noted otherwise.

Figure 1:
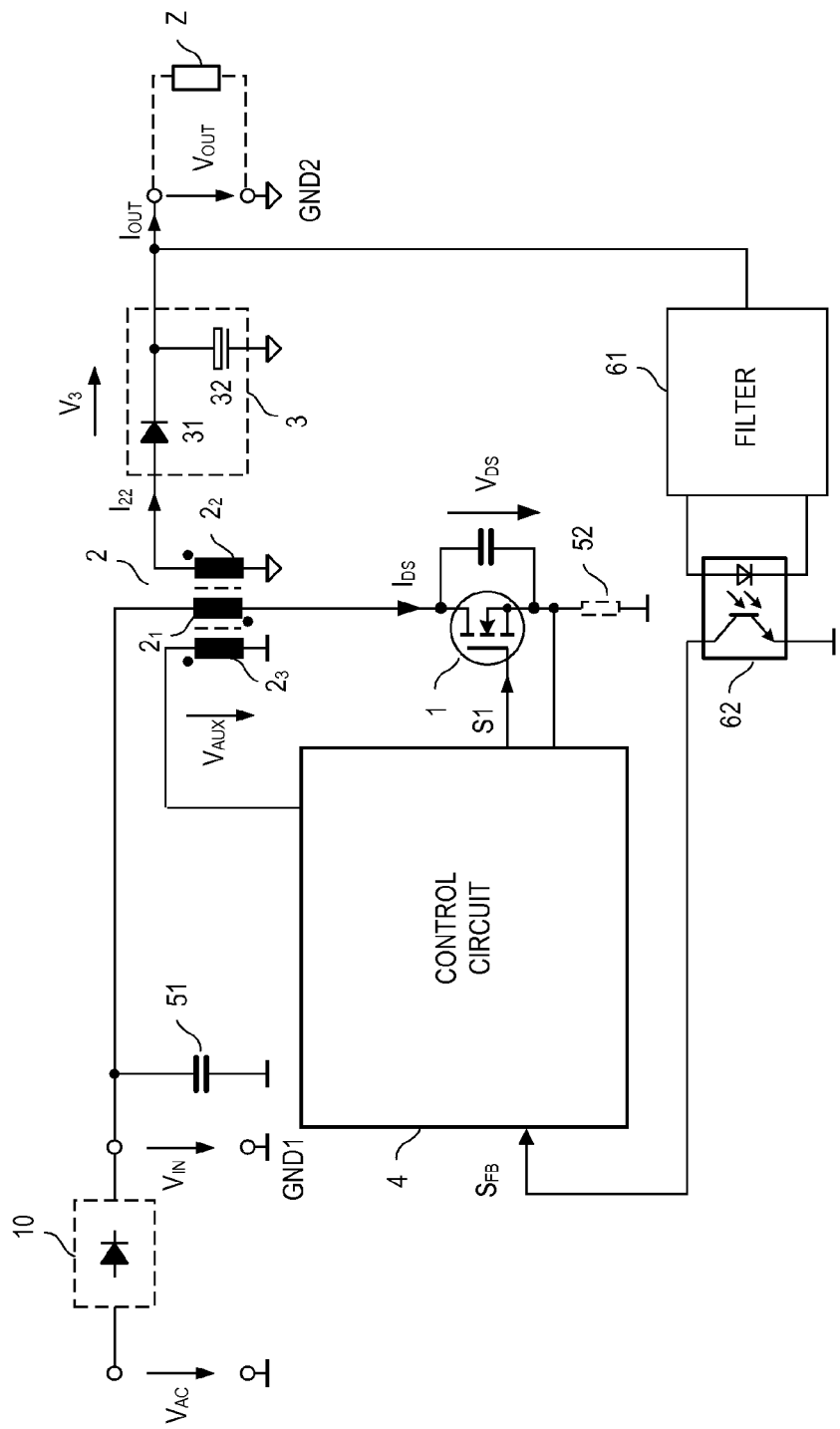
FIG. 1 shows a flyback converter according to one embodiment.

FIG. 1 shows a voltage converter (switched mode power supply, SMPS) according to one embodiment. The voltage converter shown in FIG. 1 has a flyback converter topology and will briefly be referred to as flyback converter in the following. The flyback converter includes an input with a first input node and a second input node configured to receive an input voltage $V_{IN}$ and an output with a first output node and a second output node configured to provide an output voltage $V_{OUT}$. A load Z (illustrated in dashed lines in FIG. 1) may receive the output voltage $V_{OUT}$ and an output current $I_{OUT}$ available at the output, respectively. The flyback converter includes a transformer 2 with a primary winding $2_1$ and a secondary winding $2_2$ magnetically coupled with the primary winding $2_1$. The primary winding $2_1$ and the secondary winding $2_2$ have opposite winding senses. An electronic switch 1 is connected in series with the primary winding $2_1$ whereas the series circuit with the primary winding $2_1$ and the electronic switch 1 is connected between the first and second input nodes to receive the input voltage $V_{IN}$.

Optionally, a capacitor 51, which will be referred to as input capacitor in the following, is connected between input nodes of the input. This input capacitor 51 may help to filter ripples of the input voltage $V_{IN}$. According to one embodiment, the input voltage $V_{IN}$ is a direct voltage (DC voltage). This input voltage $V_{IN}$ may be generated from an alternating voltage (AC voltage) $V_{AC}$ by a rectifier circuit 10 (illustrated in dashed lines in FIG. 1). The input voltage is referenced to a first ground node GND1, and the output voltage is referenced to a second ground node GND2.

Referring to FIG. 1, the flyback converter 1 further includes a rectifier circuit 3 connected between the secondary winding $2_2$ and the output. In the embodiment shown in FIG. 1, this rectifier circuit 3 includes a series circuit with a rectifier element 31, such as a diode, and a capacitor 32. This series circuit is connected in parallel with the secondary winding $2_2$, and the output voltage $V_{OUT}$ is available across the capacitor 32. However, this is only an exemplary implementation of the rectifier circuit 3. Other implementations of the rectifier circuit 3, such as implementations including an additional inductor, may be used as well.

A control circuit 4 is configured to drive the electronic switch 1 based on a feedback signal $S_{FB}$ received from a feedback circuit (control loop) 61, 62. The feedback circuit may include a filter 61 that receives the output voltage $V_{OUT}$ and a transmitter 62. In the embodiment shown in FIG. 1, the filter 61 is on the secondary side of the transformer, and the transmitter 62 transmits an output signal of the filter 61 from the secondary side to the primary side, whereas an output signal of the transmitter 62 is the feedback signal $S_{FB}$ received by the control circuit 4. The filter 61 is configured to generate an error signal from the output voltage and a reference signal and to generate the feedback signal $S_{FB}$ based on the error signal. This is commonly known so that no further detailed explanation is required in this regard. According to one embodiment, the filter 61 has one of a proportional (P) characteristic, a proportional-integral (PI) characteristic, a proportional-integral, derivative (PID) characteristic. According to another embodiment (not shown), the position of the filter 61 and the transmitter 62 in the feedback loop is changed so that the transmitter 62 transmits a signal representing the output voltage $V_{OUT}$ from the secondary side to the primary side and the filter receives the signal transmitted by the transmitter and generates the feedback signal $S_{FB}$. In the embodiment shown, the transmitter 62 includes an optocoupler. However, this is only an example. Other transmitters suitable to transmit a signal via a potential barrier may be used as well. Examples of such transmitter include a transmitter with a transformer, such as a coreless transformer.

The control circuit 4 is configured to operate the electronic switch 1 in a pulse-width modulated (PWM) fashion. According to one embodiment, the electronic switch 1 is a transistor. In the embodiment shown in FIG. 1, the transistor is a MOSFET (Metal Oxide Semiconductor Field-Effect Transistor), in particular an n-type MOSFET. However, this is only an example. Other types of transistors, such as an IGBT (Insulated Gate Bipolar Transistor), a JFET (Junction Field-Effect Transistor), a BJT (Bipolar Junction Transistor), or p-type MOSFET may be used as well.

Figure 2:
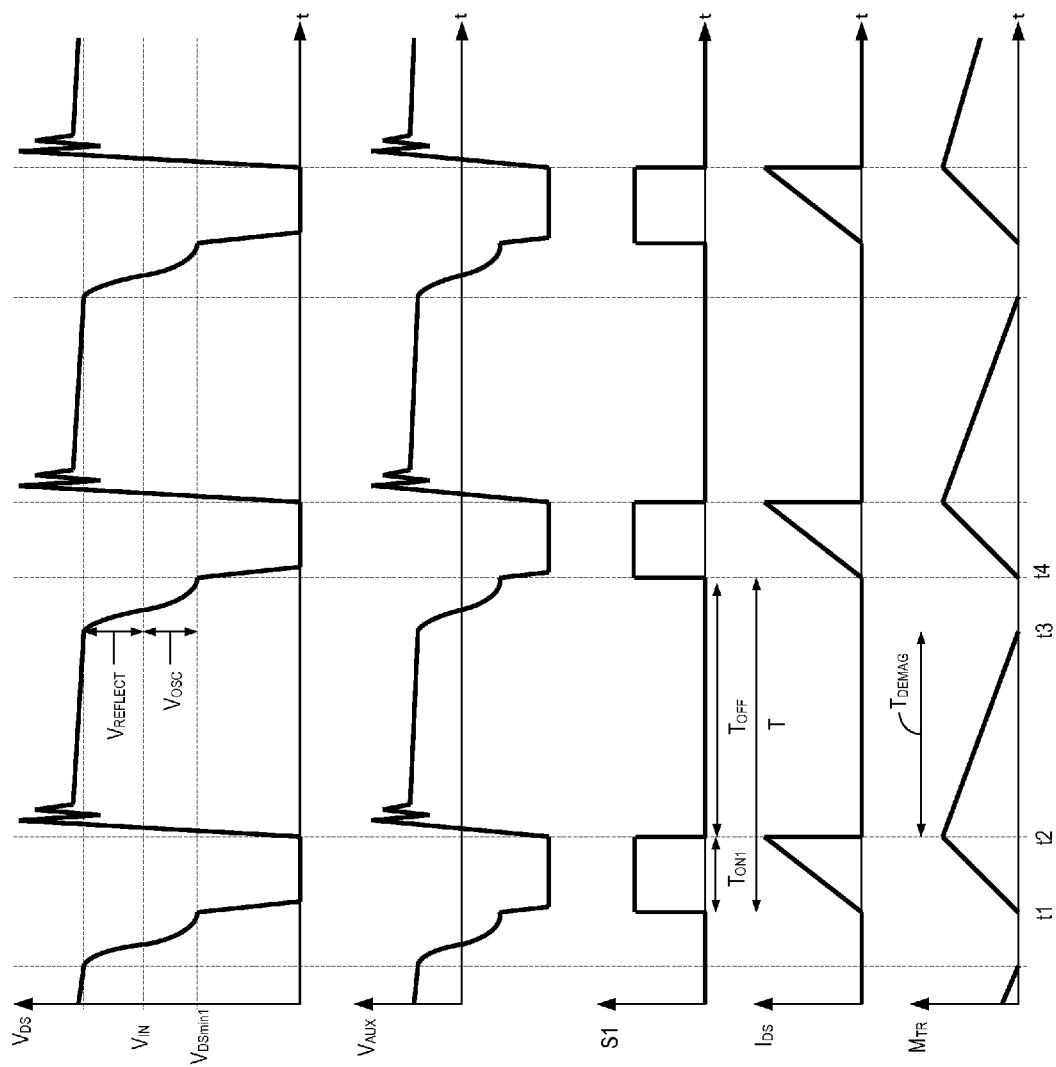
FIG. 2 shows timing diagrams which illustrate operation of a flyback converter in a quasi-resonant mode.

One way of operating the flyback converter shown in FIG. 1 is explained with reference to FIG. 2 below. FIG. 2 shows timing diagrams of a load path voltage $V_{DS}$ across a load path of the electronic switch 2, an auxiliary voltage $V_{AUX}$ across an auxiliary winding $2_3$ of the transformer, a drive signal S1 received by the electronic switch 1 from the control circuit 4, a load current $I_{DS}$ through the electronic switch 1, and a magnetization $M_{TR}$ of the transformer 1. In the MOSFET 1 shown in FIG. 1, the load path voltage $V_{DS}$ is the drain-source voltage, and the load current $I_{DS}$ is the drain-source current. The drive signal S1 is received by a gate node of the MOSFET 1. The drive signal S1 may have one of a first signal level that switches on the electronic switch 1, and a second signal level that switches off the electronic switch 1. The first level will be referred to as on-level and the second signal level will be referred to as off-level in the following. Just for the purpose of explanation, the on-level of the drive signal S1 is drawn as a high signal level in the embodiment shown in FIG. 2, and the off-level is drawn as a low level.

Referring to FIG. 2, operating the flyback converter includes a plurality of successive drive cycles, wherein in each drive cycle, the control circuit 4 switches on the electronic switch 1 for an on-period $T_{ON1}$ and, after the on-period $T_{ON1}$, switches off the electronic switch 1 for an off-period $T_{OFF}$. In the embodiment shown in FIG. 2, one of these drive cycles begins at time t1 and ends at time t4, which is when the next drive cycle starts. During the on-period $T_{ON1}$, the input voltage $V_{IN}$ causes the load current $I_{DS}$ to flow through the primary winding $2_1$ and the electronic switch 1, whereas a current level of the load current $I_{DS}$ increases during the on-period $T_{ON1}$. This increasing load current $I_{DS}$ is associated with an increasing magnetization $M_{TR}$ of the transformer 2, whereas such magnetization is associated with magnetically storing energy in the transformer 2 (more precisely, in an air gap of the transformer 2), whereas the stored energy increases as the load current $I_{DS}$ increases. During the on-period $T_{ON1}$, the load path voltage $V_{DS}$ of the electronic switch 1 is substantially zero, and a voltage across the primary winding $2_1$ substantially equals the input voltage $V_{IN}$. In the embodiment shown in FIG. 1, the auxiliary winding $2_3$ and the primary winding $2_1$ have opposite winding senses. In this case, a voltage level of the auxiliary voltage $V_{AUX}$ is given by $$V_{AUX} = -(N_{AUX}/N_{21}) \cdot V_{21} \qquad (1),$$

where $N_{AUX}$ is the number of windings of the auxiliary winding $2_3$, $N_{21}$ is the number of windings of the primary winding $2_1$, and $V_{21}$ is the voltage across the primary winding. Thus, during the on-period $T_{ON1}$, the voltage level of the auxiliary voltage $V_{AUX}$ is $-N_{AUX}/N_{21} \cdot V_{IN}$.

When the electronic switch 1 switches off, the energy stored in the transformer 2 is transferred to the secondary winding $2_2$, the rectifier circuit 3, and the load Z, respectively. This causes the transformer 2 to be demagnetized. In FIG. 2, $T_{DEMAG}$ denotes a time period in which the transformer 2 is demagnetized, that is, in which energy is transferred to the secondary side of the transformer. In this time period $T_{DEMAG}$, which is also referred to as demagnetizing period in the following, the load path voltage $V_{DS}$ substantially equals the input voltage $V_{IN}$ plus a reflected voltage $V_{REFLECT}$. The reflected voltage $V_{REFLECT}$ is substantially given by $$V_{REFLECT} = N_1/N_2 \cdot (V_{OUT} + V_3) \qquad (2),$$

where $N_1$ is the number of windings of the primary winding $2_1$, $N_2$ is the number of windings of the secondary winding $2_2$, and $V_3$ is the voltage across the rectifier circuit 3. The voltage $V_3$ across the rectifier circuit 3 is dependent on a current level of a current $I_{22}$ through the secondary winding $2_2$. This current $I^{22}$ decreases over the demagnetizing period $T_{DEMAG}$, so that the reflected voltage $V_{REFLECT}$ decreases and, at the end of the demagnetizing period $T_{DEMAG}$, reaches $N_1/N_2 \cdot V_{OUT}$.

In the quasi-resonant mode, there is a delay time between a time t3 when the transformer 2 has been completely demagnetized and a time t4 when a next drive cycle starts, that is, when the electronic switch 2 is again switched on. In this time period, the load path voltage $V_{DS}$ oscillates. This is due to a parasitic resonant circuit that includes the primary winding $2_1$ and a parasitic capacitance of the electronic switch 1. This parasitic capacitance may include a capacitance in parallel with the load path of the electronic switch 2. Such parasitic capacitance is represented by a capacitor connected in parallel with the load path in the embodiment shown in FIG. 1. In the quasi-resonant mode, the control circuit 4 switches on the electronic switch 1 when the load path voltage $V_{DS}$ reaches a minimum $V_{DSmin1}$ after the transformer 2 has been demagnetized. However, the voltage level of the minimum voltage $V_{DSmin1}$ may be relatively high so that relatively high switching losses may occur. These switching losses include, for example, losses in connection with discharging the parasitic capacitance of the electronic switch 1. These losses are the higher, the higher the voltage level of the load path voltage $V_{DS}$ is at the time t1 of switching on the electronic switch 1. Furthermore, the switching frequency in the quasi-resonant mode varies and, inter alia, is dependent on the on-period $T_{ON1}$. However, there are applications where such variation of the switching frequency is undesirable and where it is desired to operate the flyback converter at a predefined frequency. This predefined frequency may be fixed or may be dependent on a power consumption of the load Z.

Figure 3:
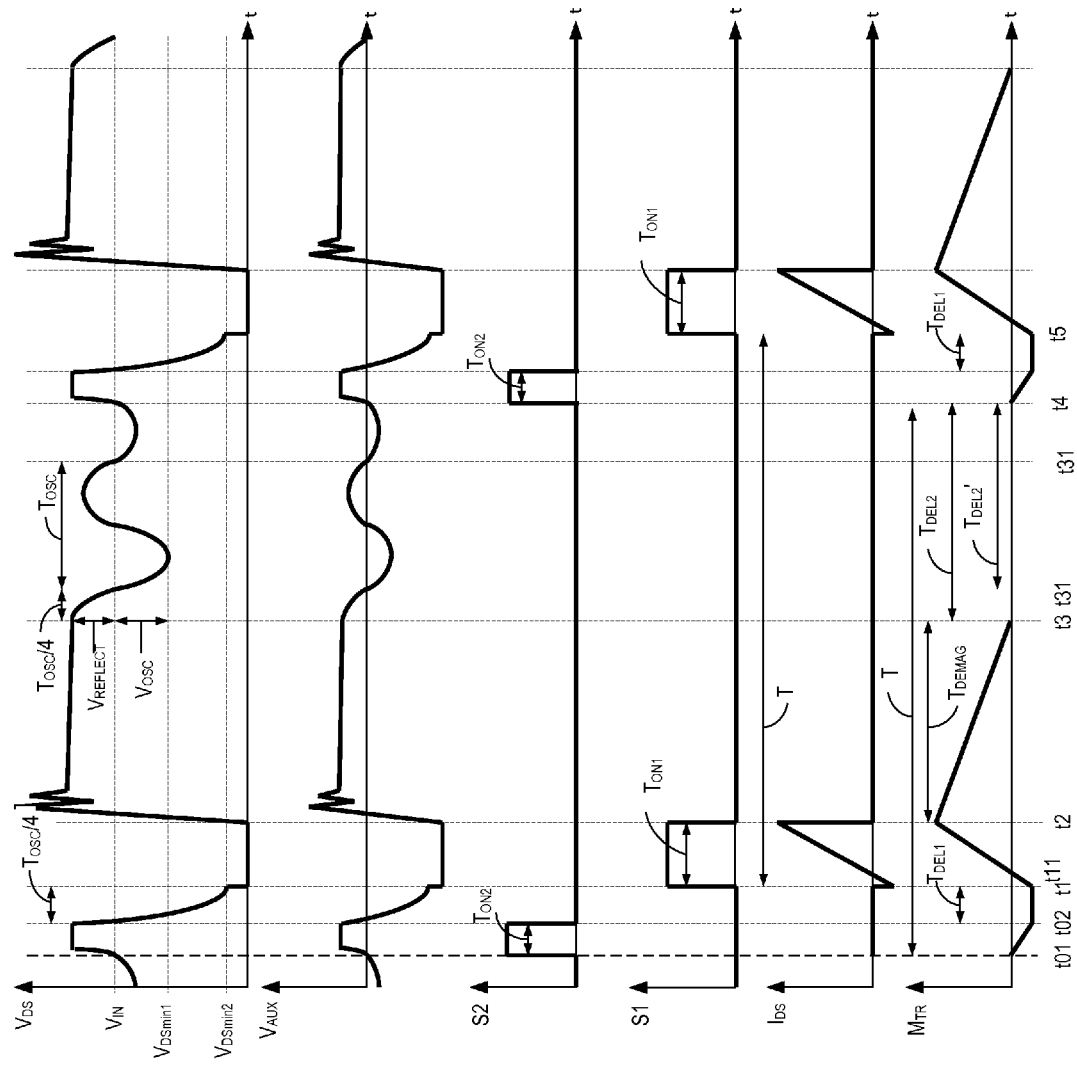
FIG. 3 shows timing diagrams which illustrate one way of operation of a flyback converter at a predefined frequency.

FIG. 3 shows timing diagrams of a method that provides for switching the electronic switch 1 at a predefined frequency and offers low switching losses. FIG. 3 shows timing diagrams of the load path voltage $V_{DS}$, the auxiliary voltage $V_{AUX}$, the drive signal S1 of the electronic switch 1, the load current $I_{DS}$ of the electronic switch 1, and the magnetization $M_{TR}$ of the transformer 2. The magnetization represents the magnetic flux in a core (not shown) of the transformer 2 and the magnetic flux density, respectively.

Referring to FIG. 3, the method includes in each drive cycle, prior to switching on the electronic switch 1 for the on-period $T_{ON1}$, to pre-magnetize the transformer 2 for a pre-magnetizing period $T_{ON2}$ and, after pre-magnetizing the transformer 2, to wait for a first delay time $T_{DEL1}$ before switching on the electronic switch 1. Pre-magnetizing the transformer 2 may include switching on a further electronic switch different from the electronic switch 1. Examples of such further electronic switch are explained in greater detail herein below. In the following, the electronic switch 1 connected in series with the primary winding $2_1$ will be referred to as first electronic switch, and the further electronic switch used to pre-magnetize the transformer 2 will be referred to as second electronic switch. A drive signal S2 for driving this second electronic switch is also shown in FIG. 3. In this embodiment, a high-level represents an on-level that switches on the second electronic switch to pre-magnetize the transformer, and a low-level represents an off-level that switches off the second switch. Pre-magnetizing the transformer 2 includes magnetizing the transformer 2 such that immediately after switching on the first electronic switch 1, the load current $I_{DS}$ flows in a direction opposite the direction shown in FIG. 1. The load current flows in this opposite direction until the transformer 2 has been demagnetized. That is, the magnetization $M_{TR}$ obtained in the pre-magnetizing period $T_{ON2}$ has a polarity that is opposite the polarity of the magnetization $M_{TR}$ at the end of the on-period $T_{ON1}$. That is, the magnetization $M_{TR}$ changes its polarity in the on-period $T_{ON1}$. In FIG. 3, t11 denotes a time, when the magnetization $M_{TR}$ is zero and changes its polarity. In the following, the magnetization (magnetic flux) $M_{TR}$ obtained in the pre-magnetizing period $T_{ON2}$ will be referred to as negative magnetization, and the magnetization after time t11 will be referred to as positive magnetization.

Negatively magnetizing the transformer 2 includes magnetically storing energy in the transformer 2. After the pre-magnetizing period $T_{ON2}$, that is, in the first delay time $T_{DEL1}$ between the pre-magnetizing period $T_{ON2}$ and the on-period $T_{ON1}$, the energy stored in the transformer 2 and in the parasitic capacitance of the electronic switch 1 cause an oscillation of the load path voltage $V_{DS}$ of the electronic switch. By virtue of the transformer 2 being negatively magnetized, the amplitude of this oscillation is higher than the amplitude of the oscillation at the end of the demagnetizing period $T_{DEMAG}$ explained herein before. Thus, a voltage minimum $V_{DSmin2}$, the load path voltage $V_{DS}$ reaches in the first delay time $T_{DEL1}$ is lower than the minimum $V_{DSmin1}$ the load path voltage $V_{DS}$ reaches after the end of the demagnetizing period $T_{DEMAG}$. According to one embodiment, the first delay time $T_{DEL1}$ is chosen such that the first electronic switch 1 switches on when the load path voltage $V_{DS}$ reaches the minimum $V_{DSmin2}$. This first delay time $T_{DEL1}$ is controlled by the control circuit 4.

At the beginning of the on-period $T_{ON1}$, the energy stored in the transformer 2 during the pre-magnetizing period $T_{ON2}$ is transferred to the input and the input capacitor 51, respectively. The time period in which this energy is transferred to the input is represented by the time period in which the load current $I_{DS}$ is negative in the timing diagram shown in FIG. 3. The transformer has been demagnetized when the load current $I_{DS}$ reaches zero (and the magnetization $M_{TR}$ reaches zero) at time t11. After time t11 the transformer 2 is positively magnetized until the first electronic switch 1 switches off at time t2. After the on-period $T_{ON1}$, during the demagnetizing period $T_{DEMAG}$, the energy stored in the transformer is transferred to the secondary winding $2_2$, the rectifier circuit 3 and the load Z, as explained before.

In the method shown in FIG. 3, switching losses are lower than in the quasi-resonant mode (see FIG. 2) as the first electronic switch 1 switches on at a lower load path voltage, namely at $V_{DSmin2}$ as opposed to $V_{DSmin1}$ in the quasi-resonant mode. Pre-magnetizing the transformer 2 is not associated with significant losses, as the energy used to pre-magnetize the transformer 2 is fed back to the input and the input capacitor 51, respectively, at the beginning of the on-period $T_{ON1}$ The level of the second minimum $V_{DSmin2}$ is, inter alia, dependent on the demagnetizing period $T_{ON2}$, whereas the voltage level of the minimum $V_{DSmin2}$ decreases as the demagnetizing period $T_{ON2}$ increases. According to one embodiment, the demagnetizing period $T_{ON2}$ is adjusted such that the voltage level of the second minimum $V_{DSmin2}$ is higher than zero. The electronic switch 1 may have a parasitic capacitance that increases as the load path voltage $V_{DS}$ decreases. Thus, the energy to be stored in the transformer 2 in the pre-magnetizing period $T_{ON2}$ required to discharge the parasitic capacitance in the first delay time $T_{DEL1}$ increases disproportionally the lower the desired voltage level of the second minimum $V_{DSmin2}$ is. According to one embodiment, the demagnetizing period $T_{ON2}$ is such that the voltage level of the minimum $V_{DSmin2}$ is 5V or higher, 10V or higher, or 20V or higher. According to one embodiment, the minimum is lower than 50V.

The pre-magnetizing period $T_{ON2}$ can start any time after the demagnetizing period $T_{DEMAG}$. That is, there is no need to begin the pre-magnetizing period $T_{ON2}$ at a specific phasing of the parasitic oscillation of the load path voltage $V_{DS}$ occurring after the demagnetizing period $T_{DEMAG}$. Thus, the transformer 2 can be pre-magnetized at a predefined (fixed) frequency. That is, a time period T between the beginning of the pre-magnetizing period $T_{ON2}$ in one drive cycle and the beginning of the pre-magnetizing period $T_{ON2}$ in a successive drive cycle can be constant. If, for example, the pre-magnetizing period $T_{ON2}$ is substantially the same in each drive cycle and the first delay time $T_{DEL1}$ is substantially the same in each drive cycle, then the switching frequency of the first electronic switch 1 equals the predefined (fixed) frequency f=1/T at which the transformer is pre-magnetized. Thus, the method shown in FIG. 3 may provide for a fixed frequency operation of the electronic switch 1 in the flyback converter. "Fixed frequency operation" means that the switching frequency is substantially fixed during operation of the flyback converter independent of a power consumption of the load. According to another embodiment, the controller 4 varies the switching frequency based on a power consumption of the load Z, whereas the switching frequency may decrease as the power consumption decreases. The power consumption of the load Z is represented by the feedback signal $S_{FB}$. The power consumption of the load substantially equals an instantaneous output power of the flyback converter.

The on-period $T_{ON1}$ of the first electronic switch 1 can be controlled in a conventional way dependent on the feedback signal $S_{FB}$ and, therefore, dependent on a power consumption of the load Z. When the power consumption of the load Z increases, the on-period $T_{ON1}$ becomes longer, consequently, the demagnetizing period $T_{DEMAG}$ becomes longer, and the second delay time $T_{DEL2}$ becomes shorter. If the power consumption of the load Z decreases, the on-period $T_{ON1}$ becomes shorter, consequently, the demagnetizing period $T_{DEMAG}$ becomes shorter, and the second delay time $T_{DEL2}$ becomes longer.

In FIG. 3, $T_{OSC}$ denotes the period of the parasitic oscillation of the load path voltage $V_{DS}$ occurring after the demagnetizing period $T_{DEMAG}$. This period $T_{OSC}$ is substantially equal the period of the parasitic oscillations in the first delay time $T_{DEL1}$ that causes the load path voltage $V_{DS}$ to decrease. Referring to FIG. 3, the first delay time $T_{DEL1}$ may be substantially one quarter of the oscillation period, that is, $T_{OSC}/4$. This oscillation period $T_{OSC}$ is dependent on a voltage level of the input voltage $V_{IN}$. Thus, according to one embodiment, the first delay time $T_{DEL1}$ is adjusted dependent on the voltage level of the input voltage $V_{IN}$. As the voltage level of the input voltage $V_{IN}$ is usually constant during operation of the flyback converter or changes slowly, so that the voltage level is constant over a plurality of subsequent drive cycles, adjusting the first delay time $T_{DEL1}$ dependent on the input voltage $V_{IN}$ does not affect the predefined frequency operation of the first electronic switch 1. The same applies to adjusting the pre-magnetizing period $T_{ON2}$ dependent on the input voltage $V_{IN}$. According to one embodiment, the pre-magnetizing period $T_{ON2}$ is adjusted such that it becomes longer as the voltage level of the input voltage $V_{IN}$ increases.

According to one embodiment, the method includes measuring the oscillation period $T_{OSC}$ in the second delay time $T_{DEL2}$ of one drive cycle and to adjust the first delay time $T_{DEL1}$ in one or more subsequent drive cycles based on this measurement. As, referring to the above, the oscillation period $T_{OSC}$ is dependent on the voltage level of the input voltage $V_{IN}$ and this voltage level is either constant or changes slowly, it may be sufficient to measure the oscillation period $T_{OSC}$ not in every drive cycle but every several drive cycles.

The oscillation period $T_{OSC}$ can be measured based on the auxiliary voltage $V_{AUX}$. For example, measuring the oscillation period $T_{OSC}$ may include detecting those times when the auxiliary voltage $V_{AUX}$ is zero and measuring a time period between a time t31 when the auxiliary voltage $V_{AUX}$ reaches zero for the first time, and a time t32 when the auxiliary voltage $V_{AUX}$ reaches zero for the third time. According to another embodiment, a time difference between two subsequent times when the auxiliary voltage $V_{AUX}$ reaches zero is measured. This time corresponds to half of the oscillation period $T_{OSC}$, that is, $T_{OSC}/2$. Based on this, the oscillation period $T_{OSC}$ can be calculated.

The method shown in FIG. 3 may be implemented in different ways. According to one embodiment, the pre-magnetizing periods $T_{ON2}$ begin at a predefined frequency. Referring to the above, the predefined frequency may be fixed or may be dependent on the power consumption of the load. A clock signal may be used to define the beginning of these pre-magnetizing periods $T_{ON2}$ at the predefined frequency. In FIG. 3, t01 and t4 denote those times at which the pre-magnetizing periods begin. The pre-magnetizing period $T_{ON2}$, the first delay time $T_{DEL1}$ and the on-period $T_{ON1}$ may be adjusted (calculated) as explained above. The demagnetizing period $T_{DEMAG}$ and the second delay time $T_{DEL2}$ are dependent on the on-period $T_{ON1}$ and adjust automatically, as $$T_{DEL2}+T_{DEMAG}=T-(T_{ON1}+T_{DEL1}+T_{ON2}) \quad (3).$$

According to another embodiment, the on-periods $T_{ON1}$ begin at a predefined frequency, which may be fixed or dependent on a power consumption of the load. That is, the control circuit 4 switches on the first electronic switch 1 at a predefined frequency. A clock signal may be used to define those times when the on-periods $T_{ON1}$ begin, that is, when the electronic switch 1 switches on. In Figure t1 and t5 denote those times when the on-periods $T_{ON1}$ begin. Again, the on-periods $T_{ON1}$, the pre-magnetizing periods $T_{ON2}$ and the first delay time $T_{DEL1}$ may be adjusted (calculated) as explained above. Based on these parameters and based on the period T of one drive cycle, the times when the pre-magnetizing periods $T_{ON2}$ begin are calculated. Referring to FIG. 3, a time period between the beginning of one on-period $T_{ON1}$ and the beginning of the next pre-magnetizing period $T_{ON2}$ is the on-period $T_{ON1}$ plus the demagnetizing period $T_{DEMAG}$ plus the second delay time $T_{DEL2}$ ($T_{ON1}+T_{DEMAG}+T_{DEL2}$). This time period can be easily calculated from the period T of one drive cycle T, the pre-magnetizing period $T_{ON2}$ and the first delay time $T_{DEL1}$ as follows:

$$T_{ON1}+T_{DEMAG}+T_{DEL2}=T-(T_{ON2}+T_{DEL1}) \quad (4).$$

According to yet another embodiment, the period T of one drive cycle and the switching frequency (which is 1/T), respectively, is adjusted by adjusting (calculating) the second delay time $T_{DEL2}$. Referring to FIG. 3, one drive cycle period T is given by $$T=(T_{ON1}+T_{DEMAG}+T_{DEL2}+T_{ON2}+T_{DEL1}) \quad (5a),$$

whereas the on-period $T_{ON1}$, the pre-magnetizing period $T_{ON2}$, and the first delay time $T_{DEL1}$ may be adjusted (calculated) as mentioned above. The demagnetizing period $T_{DEMAG}$ adjusts automatically based on the on-period $T_{ON1}$. Thus, given that the parameters $T_{ON1}$, $T_{ON2}$ and $T_{DEL1}$ are adjusted and $T_{DEMAG}$ adjusts automatically a desired period T of one drive cycle can be adjusted by adjusting the second delay time $T_{DEL2}$. Thus, there is no clock signal required that defines the beginning of the on-periods $T_{ON1}$ or the pre-magnetizing periods $T_{ON2}$, respectively. Based on equation (5a), the second delay time is $T_{DEL2}$ can be calculated as follows:

$$T_{DEL2}=T-(T_{ON1}+T_{DEMAG}+T_{ON2}+T_{DEL1}) \quad (5b).$$

The desired drive cycle period T can be fixed or can be dependent on a power consumption of the load. In the latter case, the drive cycle period T may increase as the power consumption decreases, so that the switching frequency decreases as the power consumption decreases.

Adjusting the second delay time $T_{DEL2}$ and, therefore, adjusting the drive cycle period T (the switching frequency) based on equations (5a) and (5b) requires that the demagnetizing period $T_{DEMAG}$ be measured (captured). Measuring the demagnetizing period may include measuring the time period between the end of the on-period $T_{ON1}$ at time t2 and the time t3 when the transformer has been demagnetized. The time t2 is the time, when the drive signal S1 switches to an off-level. Furthermore, the time t2 is given by the time when the pre-magnetizing period $T_{ON2}$ begins plus the pre-magnetizing period $T_{ON2}$, the first delay time $T_{DEL1}$, and the on-period $T_{ON1}$. The latter are adjusted (calculated) as explained above. One drive cycle begins at the beginning of the pre-magnetizing period $T_{ON2}$ as defined by the second delay time $T_{DEL2}$.

According to one embodiment, the drive cycle period T is adjusted by adjusting a third delay time $T_{DEL2}'$. Referring to FIG. 3, this third delay time $T_{DEL2}'$ equals the second delay time $T_{DEL2}$ minus one quarter of the oscillation period $T_{OSC}$. That is, $$T_{DEL2}'=T_{DEL2}-T_{OSC}/4 \qquad (6).$$

Based on equations (5b) and (6), the third delay time $T_{DEL2}'$ can be calculated as follows:

$$T_{DEL2}'=T-(T_{ON1}+T_{DEMAG}+(T_{OSC}/4)+T_{ON2}+T_{DEL1}) \qquad (7).$$

In other words, the drive cycle period T can be adjusted by adjusting the third delay time $T_{DEL2}'$, given that $T_{ON1}$, $T_{ON2}$ and $T_{DEL1}$ are adjusted as explained above and $T_{DEMAG}$ and $T_{OSC}/4$ adjust automatically. Adjusting the second delay time $T_{DEL2}$ and, therefore, adjusting the drive cycle period T (the switching frequency) based on equation (7) requires that the demagnetizing period $T_{DEMAG}$ plus one quarter $T_{OSC}/4$ of one oscillation period $T_{OSC}$ be measured. Measuring this may include measuring the end of the on-period $T_{ON1}$ at time t2 and detecting when the auxiliary voltage $V_{AUX}$ crosses zero for the first time after the end of the on-period $T_{ON1}$. In FIG. 3, t31 denotes the time when auxiliary voltage $V_{AUX}$ crosses zero for the first time after the end of the on-period $T_{ON1}$.

Figure 4:
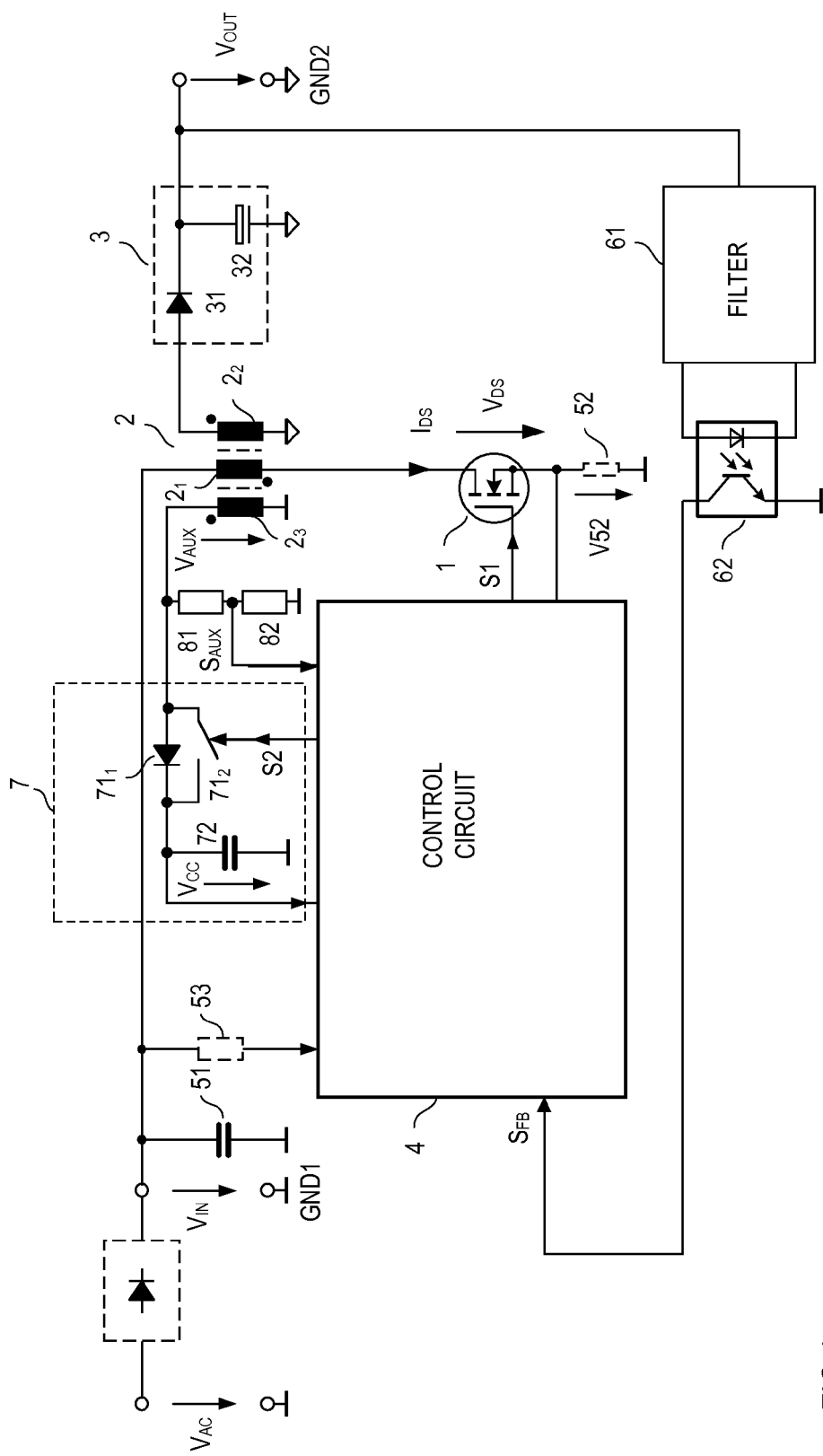
FIG. 4 shows one embodiment of a flyback converter that includes means according to one embodiment for pre-magnetizing a transformer in the flyback converter.

FIG. 4 shows one embodiment of a flyback converter configured to perform the method shown in FIG. 3. The flyback converter shown in FIG. 4 is based on the flyback converter shown in FIG. 1 and additionally includes a supply circuit 7 coupled to the auxiliary winding $2_3$ and configured to generate a supply voltage $V_{CC}$ received by the control circuit 4. The supply circuit 7 includes a series circuit with a rectifier element $71_1$ such as a diode, and a capacitor 72 connected in parallel with the auxiliary winding $2_3$. A second electronic switch $71_2$ is connected in parallel with the rectifier element $71_1$. The supply voltage $V_{CC}$ is available across the capacitor 72. The second electronic switch $71_2$ receives a second drive signal S2 from the control circuit 4. Referring to the above, this drive signal S2 defines the pre-magnetizing period of the transformer 2.

One way of operation of the flyback converter shown in FIG. 4 is explained with reference to the timing diagrams shown in FIG. 3. During the demagnetizing period $T_{DEMAG}$, energy is not only transferred to the secondary winding $2_2$, the rectifier circuit 3 and the load Z, but also to the capacitor 72 of the supply circuit 7 via the auxiliary winding $2_3$ and the rectifier element $71_1$. In the pre-magnetizing period $T_{ON2}$, the control circuit 4 closes the second electronic switch $71_2$. This causes the transformer 2 to be pre-magnetized, whereas the energy stored in the transformer 2 during the pre-magnetizing period $T_{ON2}$ is provided by the supply capacitor 72 of the supply circuit 7.

Optionally, the flyback converter includes a voltage divider connected in parallel with the auxiliary winding $2_3$. In this embodiment, not the auxiliary voltage $V_{AUX}$ but a signal $S_{AUX}$ proportional to the auxiliary voltage $V_{AUX}$ is provided to the control circuit 4. Optionally, the control circuit 4 receives the input voltage $V_{IN}$ via a resistor 53. The input voltage $V_{IN}$ received by the control circuit 4 may be used to supply the control circuit 4 before the electronic switch 1 is switched on for the first time, that is, before start-up of flyback converter. Additionally, the control circuit 4 may use the information on the voltage level of the input voltage $V_{IN}$ to control the demagnetizing period $T_{ON2}$ and the first delay time $T_{DEL1}$, respectively. Alternatively, the first delay time $T_{DEL1}$ is adjusted by measuring the oscillation period $T_{OSC}$.

The control circuit 4 can be implemented using dedicated analog circuitry or using hardware and software. According to one embodiment, the control circuit includes a microprocessor or microcontroller on which a software configured to perform the method explained with reference to FIG. 3 is running.

The control circuit 4 may operate in the current mode (CM). In this embodiment, the control circuit 4 receives a voltage V52 from a shunt resistor connected in series with the first electronic switch 1. This voltage V52 is proportional to the load current $I_{DS}$. In this embodiment, the control circuit 4 is configured to adjust the on-period $T_{ON1}$ based on the voltage V52 and the feedback signal $S_{FB}$. According to another embodiment, the control circuit 4 is configured to calculate the on-period $T_{ON1}$ only based on the feedback signal $S_{FB}$.

Figure 5:
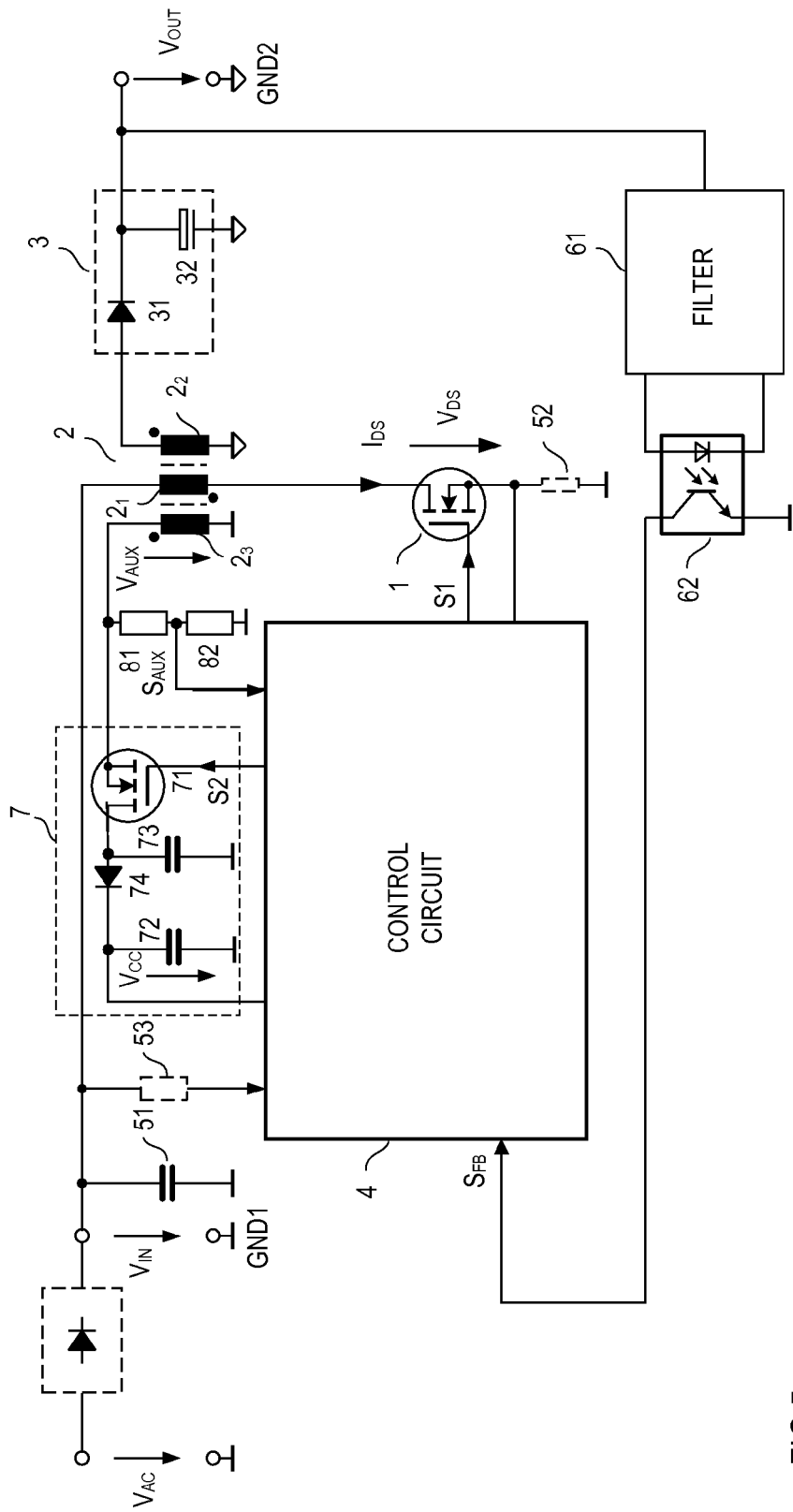
FIG. 5 shows a modification of the flyback converter according to FIG. 4.

The rectifier element $71_1$ and the parallel switch $71_2$ shown in FIG. 5 may be implemented by a MOSFET that includes an internal body diode. FIG. 5 shows one embodiment of a flyback converter in which one MOSFET 71 replaces the rectifier element $71_1$ and the electronic switch $71_2$ as shown in FIG. 5. This MOSFET 71 is controlled by the second drive signal S2. In the flyback converter shown in FIG. 5, the supply circuit 7 includes a further capacitor 73 and a further rectifier element 74. In this embodiment, a series circuit with the second electronic switch 71 and the further capacitor 73 is connected in parallel with the auxiliary winding $2_3$, and a series circuit with the further rectifier element 74 and the supply capacitor 72 is connected in parallel with the further capacitor 73. In this embodiment, during the demagnetizing period $T_{DEMAG}$, the supply capacitor 72 and the further capacitor 73 are charged, whereas in the pre-magnetizing period $T_{ON2}$, the electronic switch 71 only discharges the further capacitor 73. The rectifier element 74 prevents the supply capacitor 72 from being discharged. In this embodiment, pre-magnetizing the transformer 2 may not result in variations of the supply voltage $V_{CC}$.

Figure 6:
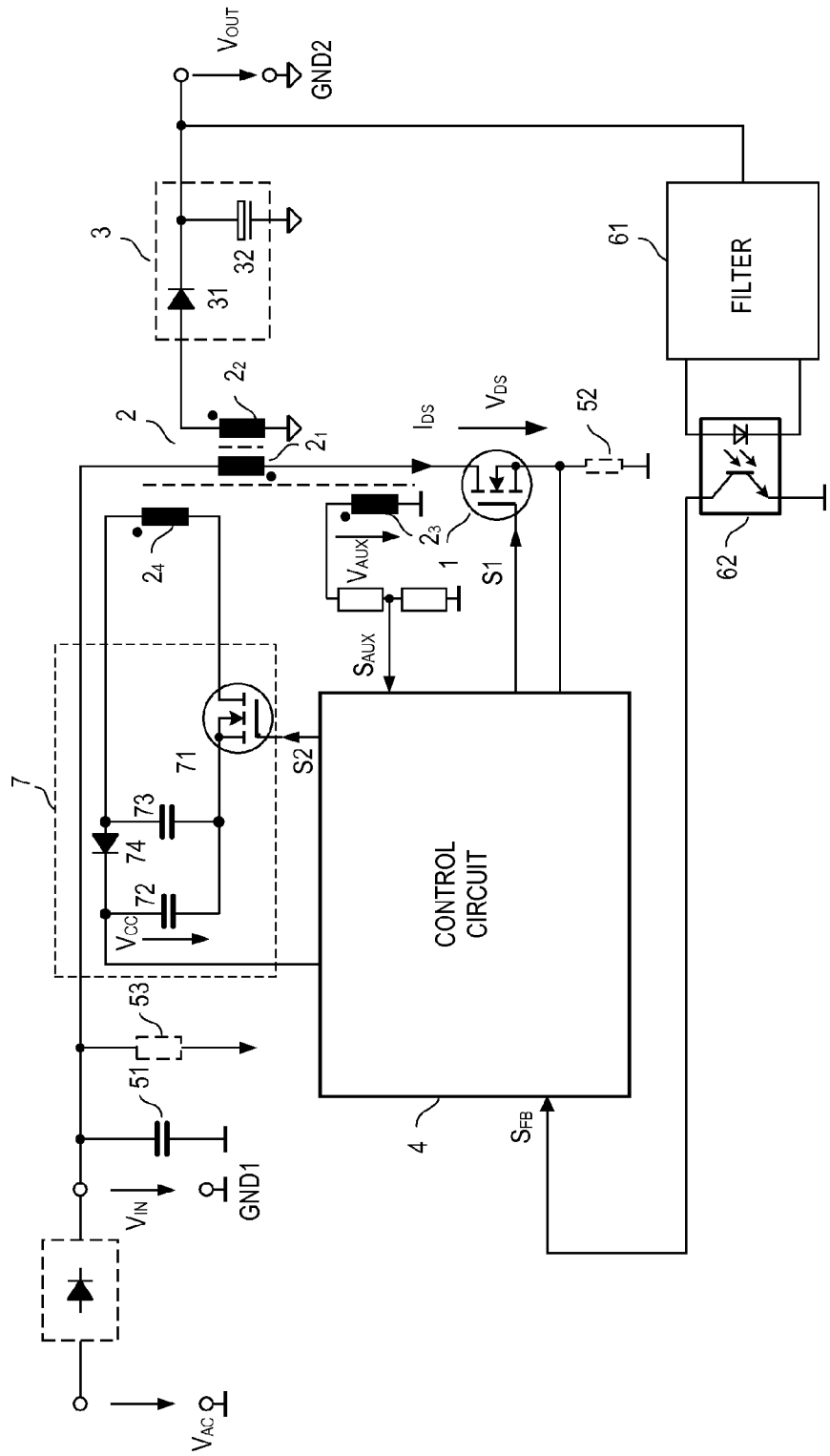
FIG. 6 shows one embodiment of a flyback converter that includes means according to one embodiment for pre-magnetizing a transformer in the flyback converter.

FIG. 6 shows another embodiment of a flyback converter. This embodiment is different from the embodiment shown in FIG. 5 in that the supply circuit 7 includes a further auxiliary winding $2_4$. This further auxiliary winding is inductively coupled with the primary winding $2_1$, the secondary winding $2_2$ and the auxiliary winding $2_3$ and has the same winding sense as the auxiliary winding $2_3$. In this embodiment, the second electronic switch 71 is connected between the further auxiliary winding $2_4$ and circuit nodes of the supply capacitor 72 and the further capacitor 73, respectively, facing away from those circuit nodes where these capacitors 72, 73 are connected to the further rectifier element 74.

Figure 7:
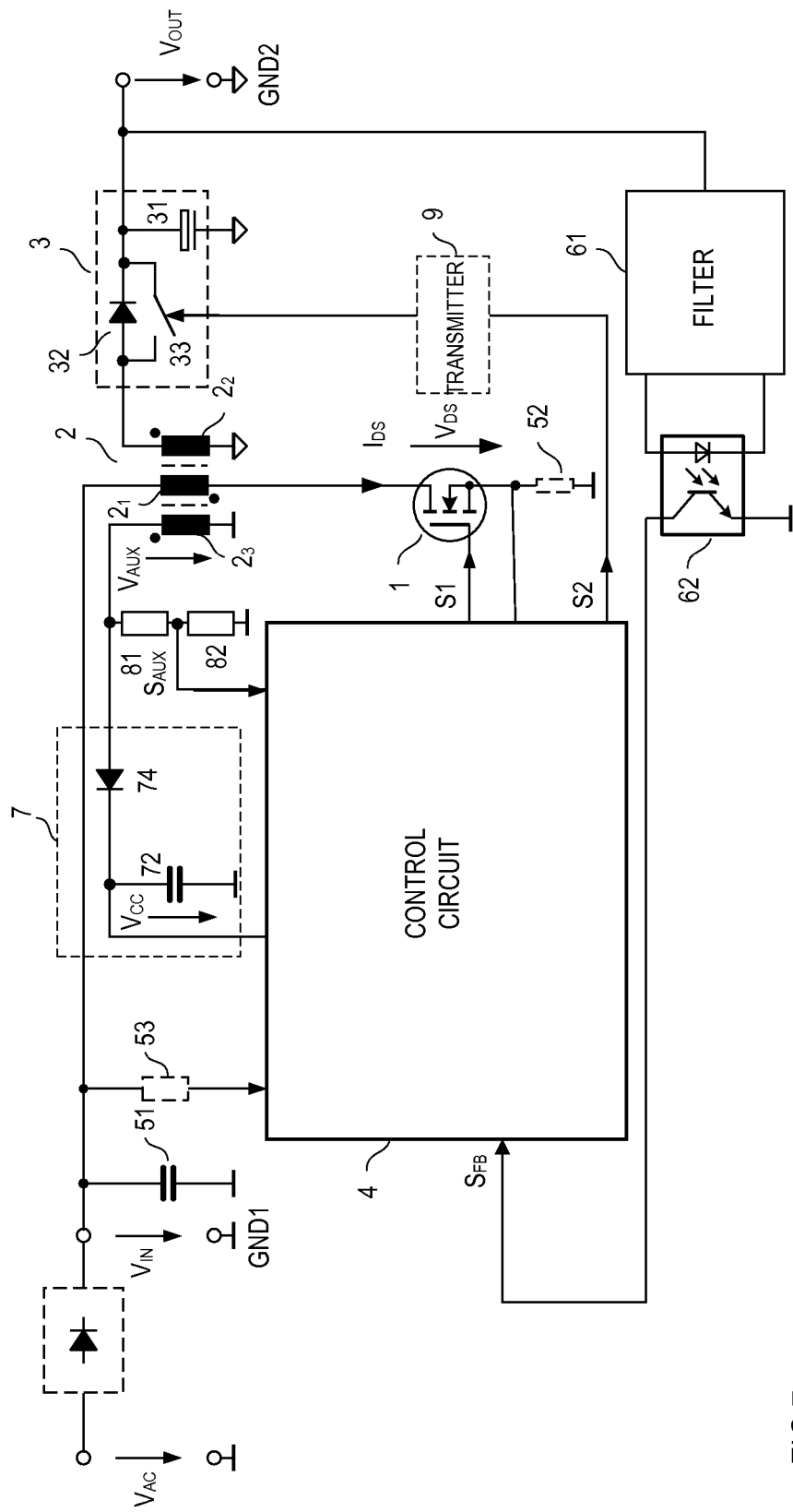
FIG. 7 shows one embodiment of a flyback converter that includes means according to one embodiment for pre-magnetizing a transformer in the flyback converter.

FIG. 7 shows another embodiment of a flyback converter. In this embodiment, the supply circuit 7 corresponds to the supply circuit shown in FIG. 4, with the electronic switch $71_1$ and the rectifier element $71_2$ being replaced by a rectifier element 74, only. In this embodiment, the secondary side rectifier circuit 3 includes a second electronic switch 33 connected in parallel with the rectifier element 32. This second electronic switch 33 may be controlled by the control circuit 4 via a transmitter 9. In this embodiment, the energy needed to pre-magnetize the transformer is provided by the output capacitor 31 when the second switch 33 is switched on in the pre-magnetizing period.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method in a voltage converter, wherein the method comprises in each of successive drive cycles:
    switching on for an on-period a first electronic switch connected in series with a primary winding of a transformer;
    before switching on the first electronic switch, pre-magnetizing the transformer for a pre-magnetizing period;
    receiving an input voltage by the voltage converter; and
    adjusting the pre-magnetizing period dependent on a voltage level of the input voltage,
wherein there is a first delay time between an end of the pre-magnetizing period and a beginning of the on-period.

2. The method of claim 1, wherein pre-magnetizing the transformer comprises switching on a second electronic switch different from the first electronic switch in the pre-magnetizing period.

3. The method of claim 1, wherein pre-magnetizing the transformer in the successive drive cycles comprises pre-magnetizing the transformer at a predefined frequency.

4. The method of claim 3, wherein the predefined frequency is defined by a clock signal.

5. The method of claim 3, wherein the predefined frequency is a fixed frequency.

6. The method of claim 3, wherein the predefined frequency is dependent on an instantaneous output power of the voltage converter.

7. The method of claim 6, wherein the predefined frequency increases as the instantaneous output power increases.

8. The method of claim 1, wherein switching on for the on-period the first electronic switch comprises switching on the first electronic switch at a predefined frequency.

9. The method of claim 8, wherein the predefined frequency is defined by a clock signal.

10. The method of claim 8, further comprising:
    calculating a beginning of the pre-magnetizing period based on a reciprocal of the predefined frequency, the on-period, the pre-magnetizing period, and the first delay time.

11. The method of claim 1, further comprising:
    adjusting a frequency at which the pre-magnetizing periods in the successive drive cycles begin by adjusting a further delay time after a demagnetizing period and a beginning of the pre-magnetizing period.

12. The method of claim L wherein adjusting the pre-magnetizing period comprises increasing the pre-magnetizing period as the level of the input voltage increases.

13. The method of claim 1, further comprising:
    receiving an input voltage by the voltage converter,
    adjusting the first delay time dependent on a voltage level of the input voltage.

14. The method of claim 13, wherein adjusting the first delay time comprises increasing the first delay time as the voltage level of the input voltage increases.

15. The method of claim 1, further comprising:
    demagnetizing the transformer in a demagnetizing period after the on-period;
    capturing, in one drive cycle, an oscillation period of a voltage oscillation across the first electronic switch after the demagnetizing period; and
    adjusting the first delay time in a drive cycle after the one drive cycle based on the captured oscillation period.

16. The method of claim 15, wherein capturing the oscillation period comprises evaluating a voltage across an auxiliary winding of the transformer, or a signal dependent.

17. The method of claim 16, wherein evaluating the voltage or the signal dependent therefrom comprises detecting zero crossings of the voltage or the signal dependent therefrom.

18. The method of claim 2,
    wherein the voltage converter comprises a control circuit configured to control the first electronic switch and the second electronic switch and a supply circuit coupled to an auxiliary winding of the transformer and configured to provide a supply voltage to the control circuit, and wherein the second electronic switch is coupled between a storage element in the supply circuit and the auxiliary winding.

19. The method of claim 18, wherein a voltage across the auxiliary winding or a signal derived therefrom is provided to the control circuit.

20. The method of claim 18,
wherein the voltage converter comprises a further auxiliary winding, and
wherein a voltage across the further auxiliary winding or a signal derived therefrom is provided to the control circuit.

21. The method of claim 2,
wherein the transformer comprises a secondary winding and the voltage converter comprises a rectifier circuit coupled to the secondary winding, and
wherein the second electronic switch is coupled between a storage element in the rectifier circuit and the secondary winding.

22. The method of claim 1, further comprising:
providing an output signal by the voltage converter;
generating a feedback signal based on a signal level of the output signal; and
adjusting the on-period based on the feedback signal.

23. The method of claim 22, wherein the output signal is one of an output voltage and an output current of the voltage converter.

24. The method of claim 1, wherein the first electronic switch comprises a transistor.

25. A voltage converter, comprising:
a transformer comprising a primary winding;
a first electronic switch connected in series with the primary winding;
a control circuit configured in each of a plurality of successive drive cycles to switch on for an on-period the first electronic switch, before switching on the first electronic switch, to cause the transformer to be pre-magnetized for a pre-magnetizing period, and to generate a first delay time between an end of the pre-magnetizing period and a beginning of the on-period;
an auxiliary winding of the transformer;
a charge storage; and
a second electronic switch coupled between the auxiliary winding and the charge storage,
wherein the control circuit is further configured to switch on the second electronic switch in the pre-magnetizing period to cause the transformer to be pre-magnetized.

26. The voltage converter of claim 25, wherein the voltage converter further comprises:
a supply circuit configured to provide a supply voltage to the control circuit,
wherein the supply circuit comprises the charge storage and the second electronic switch.

27. The voltage converter of claim 25, wherein the voltage converter further comprises:
a secondary winding of the transformer; and
a rectifier circuit coupled between the secondary winding and an output of the voltage converter,
wherein the second electronic switch is connected in the rectifier circuit between the secondary winding and the output.

28. A method in a voltage converter, wherein the method comprises in each of successive drive cycles:
switching on for an on-period a first electronic switch connected in series with a primary winding of a transformer;
before switching on the first electronic switch, pre-magnetizing the transformer for a pre-magnetizing period, wherein there is a first delay time between an end of the pre-magnetizing period and a beginning of the on-period;
receiving an input voltage by the voltage converter; and
adjusting the first delay time dependent on a voltage level of the input voltage.

29. A method in a voltage converter, wherein the method comprises in each of successive drive cycles:
switching on for an on-period a first electronic switch connected in series with a primary winding of a transformer;
before switching on the first electronic switch, pre-magnetizing the transformer for a pre-magnetizing period, wherein there is a first delay time between an end of the pre-magnetizing period and a beginning of the on-period;
demagnetizing the transformer in a demagnetizing period after the on-period;
capturing, in one drive cycle, an oscillation period of a voltage oscillation across the first electronic switch after the demagnetizing period; and
adjusting the first delay time in a drive cycle after the one drive cycle based on the captured oscillation period.

30. A method in a voltage converter, wherein the method comprises in each of successive drive cycles:
switching on for an on-period a first electronic switch connected in series with a primary winding of a transformer; and
before switching on the first electronic switch, pre-magnetizing the transformer for a pre-magnetizing period, wherein
there is a first delay time between an end of the pre-magnetizing period and a beginning of the on-period,
pre-magnetizing the transformer comprises switching on a second electronic switch different from the first electronic switch in the pre-magnetizing period,
the transformer comprises a secondary winding and the voltage converter comprises a rectifier circuit coupled to the secondary winding, and
the second electronic switch is coupled between a storage element in the rectifier circuit and the secondary winding.

* * * * *